United States Patent
Toyoda et al.

(10) Patent No.: US 11,368,595 B2
(45) Date of Patent: Jun. 21, 2022

(54) IMAGE FORMING APPARATUS, NON-TRANSITORY COMPUTER READABLE MEDIUM, AND IMAGE FORMING SYSTEM

(71) Applicant: FUJIFILM Business Innovation Corp., Tokyo (JP)

(72) Inventors: Akihito Toyoda, Kanagawa (JP); Tomohisa Ishikawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 335 days.

(21) Appl. No.: 16/182,620

(22) Filed: Nov. 7, 2018

(65) Prior Publication Data
US 2019/0149683 A1    May 16, 2019

(30) Foreign Application Priority Data
Nov. 15, 2017    (JP) .............................. JP2017-220200

(51) Int. Cl.
*H04N 1/00*    (2006.01)
*H04L 67/51*    (2022.01)

(52) U.S. Cl.
CPC ......... *H04N 1/00893* (2013.01); *H04L 67/16* (2013.01); *H04N 1/00408* (2013.01); *H04N 2201/0094* (2013.01)

(58) Field of Classification Search
CPC ........... H04N 1/00893; H04N 1/00408; H04N 2201/0094; H04L 67/16
(Continued)

(56) References Cited

U.S. PATENT DOCUMENTS 7,148,807 B2 * 12/2006 Moro ................ H04W 52/0261
                                                           340/636.1
7,254,734 B2 *  8/2007 Lehr ......................... G06F 1/26
                                                           702/64
(Continued)

FOREIGN PATENT DOCUMENTS

JP      H05072844      3/1993
JP      2001253152     9/2001
(Continued)

OTHER PUBLICATIONS

Office Action of Japan Counterpart Application, with English translation thereof, dated Jun. 22, 2021, pp. 1-11.

*Primary Examiner* — Jerome Grant, II
(74) *Attorney, Agent, or Firm* — JCIPRNET

(57) ABSTRACT

An image forming apparatus includes a function providing unit, a display, a power storage apparatus, a holding unit, and a display controller. The function providing unit provides multiple functions including an image forming function and one or more server functions. The display displays a first operation screen for operating the multiple functions. The power storage apparatus performs power supply to the image forming apparatus when power supply from an external power supply is absent. The holding unit holds setting information in which a stoppage target function and a running target function among the multiple functions are specified. The stoppage target function and the running target function are respectively stopped and run during the power supply from the power storage apparatus. The display controller performs control during the power supply from the power storage apparatus. The control is performed to display, on the display, a second operation screen indicating that the stoppage target function is unusable and the running target function is usable.

12 Claims, 12 Drawing Sheets

(58) Field of Classification Search
USPC .......................................................... 358/1.14
See application file for complete search history.

(56) References Cited

U.S. PATENT DOCUMENTS

| | | | | |
|---|---|---|---|---|
| 9,392,092 | B2* | 7/2016 | Cai | H04L 9/14 |
| 9,407,113 | B2 | 8/2016 | Tanaka | |
| 10,166,719 | B1* | 1/2019 | Yang | B29C 64/30 |
| 2002/0010854 | A1* | 1/2002 | Ogura | H04N 1/32502 |
| | | | | 713/100 |
| 2003/0095290 | A1* | 5/2003 | Koreeda | H04N 1/32694 |
| | | | | 358/402 |
| 2005/0197012 | A1* | 9/2005 | Ferentz | H01R 13/6658 |
| | | | | 439/620.17 |
| 2008/0162955 | A1 | 7/2008 | Shimizu | |
| 2013/0163056 | A1* | 6/2013 | Hanayama | H04N 1/0005 |
| | | | | 358/474 |
| 2013/0229060 | A1* | 9/2013 | Chang | H02J 9/061 |
| | | | | 307/64 |
| 2014/0063526 | A1* | 3/2014 | Yamakawa | G06F 3/1221 |
| | | | | 358/1.13 |
| 2014/0268233 | A1* | 9/2014 | Kawai | G06F 3/1288 |
| | | | | 358/1.15 |
| 2015/0156364 | A1* | 6/2015 | Fujita | H04N 1/00896 |
| | | | | 358/1.13 |
| 2015/0234620 | A1* | 8/2015 | Terashima | G06Q 30/0238 |
| | | | | 358/1.15 |
| 2017/0339305 | A1* | 11/2017 | Kawajiri | G06F 3/1203 |
| 2017/0346962 | A1* | 11/2017 | Yamada | H04N 1/32122 |
| 2018/0154670 | A1* | 6/2018 | Sano | B41J 11/002 |
| 2018/0249023 | A1* | 8/2018 | Funakawa | H04N 1/00129 |
| 2019/0052764 | A1* | 2/2019 | Hara | H04N 1/00891 |
| 2020/0153991 | A1* | 5/2020 | Drogo | G06F 3/1292 |

FOREIGN PATENT DOCUMENTS

| | | |
|---|---|---|
| JP | 2003231330 | 8/2003 |
| JP | 2008165533 | 7/2008 |
| JP | 2008180893 | 8/2008 |
| JP | 2013168869 | 8/2013 |
| JP | 2015107564 | 6/2015 |
| JP | 2016091519 | 5/2016 |

* cited by examiner

FIG. 3

| FUNCTION | POWER-OUTAGE-RESPONDING-OPERATION FLAG | BASE FUNCTION |
|---|---|---|
| SCANNING MECHANISM | OFF | |
| PRINTING MECHANISM | OFF | |
| FAXING MECHANISM | ON | |
| WIRED NETWORK | ON | |
| WIRELESS NETWORK | OFF | |
| DISPLAY | ON | |
| POST-PROCESSING APPARATUS | OFF | PRINTING MECHANISM |
| MAIL SERVER | ON | NETWORK |
| USER AUTHENTICATION SERVER | OFF | |
| FILE SERVER | ON | |
| WEB SERVER | OFF | NETWORK |
| SCANNING SERVICE | OFF | SCANNING MECHANISM |
| PRINTING SERVICE | OFF | PRINTING MECHANISM |
| COPYING SERVICE | OFF | SCANNING MECHANISM PRINTING MECHANISM |
| FAX TRANSMISSION | OFF | FAXING MECHANISM |
| FAX RECEPTION | ON (ACCUMULATION MODE) | FAXING MECHANISM |
| TELEPHONE SERVICE | ON | FAXING MECHANISM |

Templates on installation-purpose basis:
Functions to be run during UPS operation (power outage)

222

- General office
- Hospital and clinic
- Financial institution
- Public office (used by staff)
- Public office (services to residents)
- Factory
- Restaurant
- TV station
- Gymnasium

ENTER

IMAGE FORMING APPARATUS, NON-TRANSITORY COMPUTER READABLE MEDIUM, AND IMAGE FORMING SYSTEM

CROSS-REFERENCE TO RELATED APPLICATIONS

This application is based on and claims priority under 35 USC 119 from Japanese Patent Application No. 2017-220200 filed Nov. 15, 2017.

BACKGROUND

(i) Technical Field

The present disclosure relates to an image forming apparatus, a non-transitory computer readable medium, and an image forming system.

(ii) Related Art

In an example, an uninterrupted power supply is installed on or connected to an image forming apparatus such as a printer, a scanner, a copier, a facsimile machine, and a multifunction printer having functions of these apparatuses, and thereby malfunction due to abrupt stopping of the image forming apparatus during a power outage is prevented.

For example, Japanese Unexamined Patent Application Publication No. 5-72844 discloses an image forming apparatus equipped with an uninterrupted power supply. The image forming apparatus is supplied with power from the uninterrupted power supply during a power outage and thereby performs a shutdown operation. In the shutdown operation, an operation for discharging a sheet currently being printed is performed not to leave the sheet in the image forming apparatus, and other operations are performed. The image forming apparatus indicates a power outage state to notify a user of the reason for inoperability of the image forming apparatus during the shutdown operation.

Japanese Unexamined Patent Application Publication No. 2001-253152 discloses control performed not to execute a printing command during a power outage (during power supply from an uninterrupted power supply installed in an image forming apparatus) in order to extend a period of power supply from the uninterrupted power supply and thereby to keep system operations.

In addition, the following example is also known. To effectively utilize the performance of a computer built in an image forming apparatus, the computer built in the image forming apparatus runs a program for a server such as a mail server or a file server and provides a client with the server function. Moreover, there is the following example. An image forming apparatus is used as a hub for information processing in an office in such a manner that a blade server is built in the image forming apparatus or a server apparatus is externally connected to the image forming apparatus. As described above, a system configuration in which an image forming apparatus has a server function is becoming increasingly common.

SUMMARY

Aspects of non-limiting embodiments of the present disclosure relate to an image forming apparatus, a non-transitory computer readable medium, and an image forming system.

If an image forming apparatus is provided with some server functions, the image forming apparatus has not only several original image forming functions of the image forming apparatus such as a printing function, a scanning function, and a copying function but also the server functions. In a case where the image forming apparatus is provided with a power storage apparatus such as an uninterrupted power supply to be operable even during a power outage, and if power is supplied to all of the image forming functions and the server functions, a large amount of power is consumed, and thus a time period allowing operation by using the power storage apparatus is decreased. Accordingly, it is conceivable that the operating time period with the power storage apparatus is increased by limiting functions to be run during the power outage and stopping functions other than the limited functions. In this case, if a power outage state during the power outage is simply displayed, a user does not recognize usable functions and unusable functions.

It is an object of the present disclosure to enable an image forming apparatus or a system having one or more server functions to provide a user with a larger number of pieces of information regarding functions that are usable during a power outage than in a case where a power outage state is simply indicated during the power outage.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including a function providing unit, a display, a power storage apparatus, a holding unit, and a display controller. The function providing unit provides multiple functions including an image forming function and one or more server functions. The display displays a first operation screen for operating the multiple functions. The power storage apparatus performs power supply to the image forming apparatus when power supply from an external power supply is absent. The holding unit holds setting information in which a stoppage target function and a running target function among the multiple functions are specified. The stoppage target function and the running target function are respectively stopped and run during the power supply from the power storage apparatus. The display controller performs control during the power supply from the power storage apparatus. The control is performed to display, on the display, a second operation screen indicating that the stoppage target function is unusable and the running target function is usable.

BRIEF DESCRIPTION OF THE DRAWINGS

An exemplary embodiment of the present disclosure will be described in detail based on the following figures, wherein:

FIG. 3 is a table illustrating an example of power-outage-responding setting information;

FIG. 13 is a view illustrating a screen for selecting a template on an installation-purpose basis;

DETAILED DESCRIPTION

Figure 1:
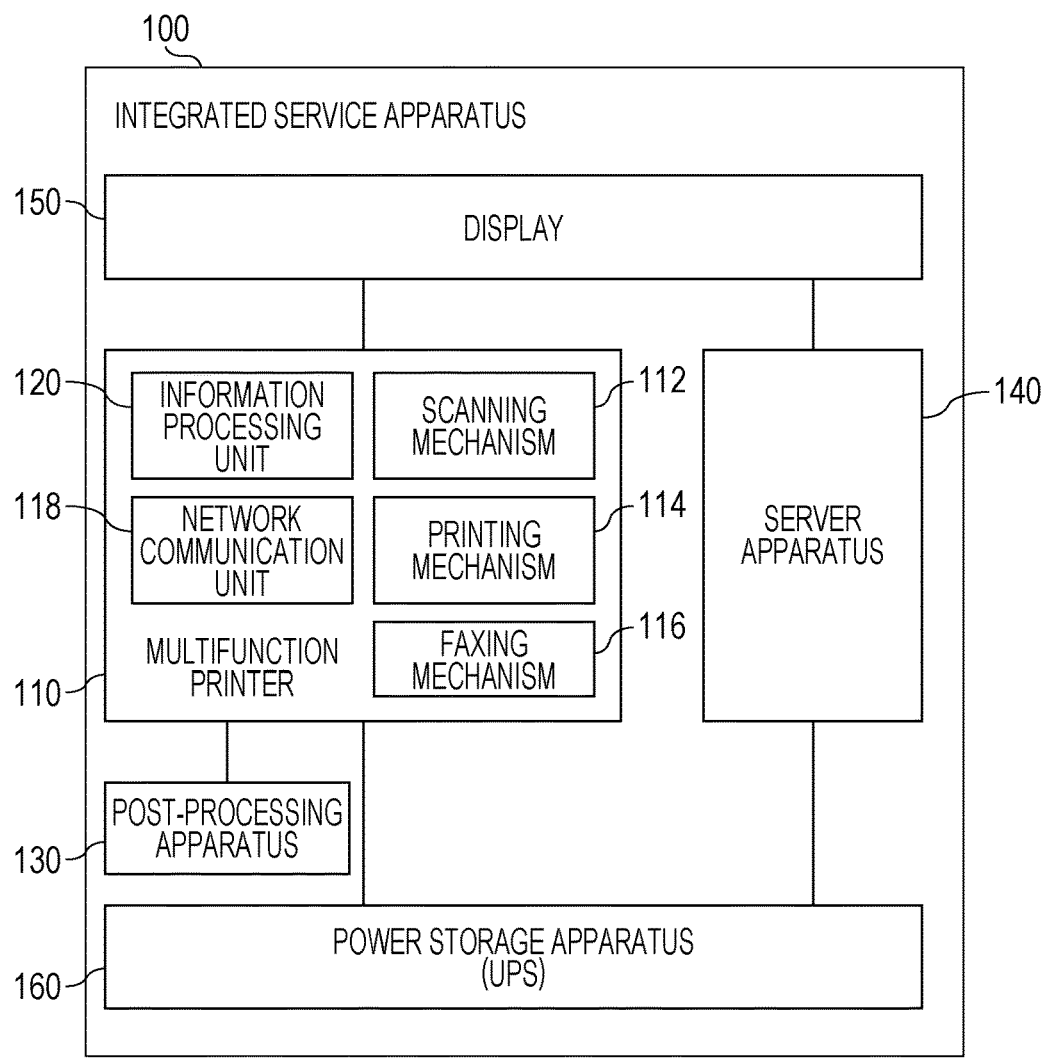
FIG. 1 is a diagram illustrating the schematic configuration of an integrated service apparatus having multifunction printer functions, server functions, and a power storage apparatus.

An exemplary embodiment of an integrated service apparatus 100 will be described with reference to FIG. 1.

The integrated service apparatus 100 includes a multifunction printer 110, a post-processing apparatus 130, a server apparatus 140, a display 150, and a power storage apparatus 160. In an example, the integrated service apparatus 100 may be configured as an apparatus having the apparatuses from the multifunction printer 110 to the power storage apparatus 160 that are built in one housing. In this case, the integrated service apparatus 100 has elements forming the respective apparatuses from the multifunction printer 110 to the power storage apparatus 160 that are built in one housing. In another example, the apparatuses from the multifunction printer 110 to the power storage apparatus 160 may be built in respective housings, and thus the integrated service apparatus 100 may be configured as a system including the housings connected to each other. In addition, the integrated service apparatus 100 may be configured as a system in an intermediate system configuration between the configurations in the respective two examples, that is, a configuration in which a system includes the multiple housings (apparatuses) connected to each other and at least one of the housings has two or more apparatuses therein among the apparatuses from the multifunction printer 110 to the power storage apparatus 160.

The multifunction printer 110 has functions of scanning, printing, copying, facsimile (FAX) transmission and reception, and other functions. The multifunction printer 110 includes, as functional components, a scanning mechanism 112, a printing mechanism 114, a faxing mechanism 116, a network communication unit 118, and an information processing unit 120.

The scanning mechanism 112 optically reads a document such as a paper document and generates a data image of the document. The information processing unit 120 stores the data image generated by the reading by the scanning mechanism 112 in a fixed memory device or a portable recording medium (for example, a universal serial bus (USB) memory) in the multifunction printer 110 or transfers the data image to a destination (such as an e-mail address or a specific folder in a file server) designed by a user, and thereby a scanning process is implemented.

The printing mechanism 114 prints, on a sheet, the data image acquired by the scanning or a data image generated from printing data described in a page description language. The printing mechanism 114 prints the image read by the scanning mechanism 112, and thereby the copying function is implemented.

The faxing mechanism 116 transmits and receives FAX data images through a telephone line. FAX transmission is implemented in such a manner that the faxing mechanism 116 transmits an image of the document read by the scanning mechanism 112 to a destination telephone number. The FAX transmission is implemented in the following manner. Specifically, the faxing mechanism 116 receives a FAX data image transmitted from the transmission source, and the data image is printed by the printing mechanism 114 or stored as a file in a predetermined folder controlled by the information processing unit 120.

The network communication unit 118 performs data communication via a network such as a local area network (LAN). The network communication unit 118 may include both or only one of a communication device that performs communication via a wired network and a communication device that performs communication conforming to a wireless network protocol such as Wi-Fi (registered trademark).

The information processing unit 120 performs information processing including control of the multifunction printer 110. The information processing unit 120 includes hardware and programs, the hardware including a central processing unit (CPU), a primary memory such as a random access memory, a secondary memory such as a hard disk or a non-volatile memory, and other components, the programs being run by the CPU and thereby implementing information processing. An information processing function run by the information processing unit 120 will be described later with reference to FIG. 2.

The post-processing apparatus 130 performs post-processing such as punching, stapling, and bookbinding on a material printed and output by the printing mechanism 114. The post-processing apparatus 130 receives power supply from the power supply circuit of the multifunction printer 110.

The server apparatus 140 provides one or more server functions of a mail server, a user authentication server, a web server, and other servers. Each server provides services to clients connected via a LAN or the Internet. In one example, the server apparatus 140 includes a computer serving as hardware for running programs for the servers (for example, configured as a blade including a CPU, a memory, and other components). The server apparatus 140 may include multiple computers as the hardware. Each computer of the server apparatus 140 runs one or more server programs, and thereby the one or more server functions provided by the integrated service apparatus 100 are implemented.

In one example, at least one of the one or more server functions provided by the integrated service apparatus 100 may be run by the information processing unit 120 of the multifunction printer 110. In another example, the server apparatus 140 may be a virtual server run by the information processing unit 120 of the multifunction printer 110. In this case, the server apparatus 140 does not exist as hardware, and all of the server functions are provided by the information processing unit 120 of the multifunction printer 110. That is, FIG. 1 illustrates the information processing unit 120 of the multifunction printer 110 and the server apparatus 140 that are separate apparatuses for convenience of explanation, but these do not have to be separated in the hardware configuration.

The display 150 displays an operation screen that is an element of the user interface (UI) of the integrated service apparatus 100. The operation screen is generated by, for example, a UI controller 1202 illustrated in FIG. 2. The display 150 may be, for example, a touch panel display. Note that the integrated service apparatus 100 may include not only the display 150 but also a mechanical numeric keypad, buttons, a display lamp, a speaker, and a UI device such as a camera.

The power storage apparatus 160 is connected to an external power supply such as a commercial power supply and normally supplies power from the external power supply to the components such as the multifunction printer 110 and the server apparatus 140 of the integrated service apparatus 100. The power storage apparatus 160 also has functions of accumulating power from the external power supply and supplying the accumulated power to the components of the integrated service apparatus 100 in a case where the power supply from the external power supply is absent. The case where the power supply from the external power supply is absent includes a case where a power outage occurs in the commercial power supply that is the external power supply due to a lightning strike or an accident, a case where the external power supply (for example, an independent power generation system) is not in operation due to a failure or the like, and a case where a connector (attachment plug) for the integrated service apparatus 100 (particularly the power storage apparatus 160) to receive the power supply from the external power supply is disconnected from a connector on the external power supply side (a receptacle, for example, a socket). Hereinafter, the states in which the power supply from the external power supply to the integrated service apparatus 100 is absent are collectively referred to as a "power outage", and a period in which such a state lasts is expressed as "during a power outage". During the power outage, the power accumulated by the power storage apparatus 160 is supplied to the components of the integrated service apparatus 100. The power storage apparatus 160 is configured as, for example, an uninterrupted power supply.

An example of the functional configuration of the information processing unit 120 will be described with reference to FIG. 2. In the description provided with reference to FIG. 1, the information processing unit 120 conveniently belongs to the multifunction printer 110. Nevertheless, the information processing unit 120 is responsible for not only control of the hardware (such as the scanning mechanism 112 and the printing mechanism 114) of the multifunction printer 110 but also overall control and processing for the integrated service apparatus 100 including the server apparatus 140, the power storage apparatus 160, and other components. The overall control for the integrated service apparatus 100 described above includes UI processing, power-outage-responding control, and the like. FIG. 2 illustrates functions regarding the UI processing, the power-outage-responding control, and the like among the various functions of the information processing unit 120.

In FIG. 2, the UI controller 1202 performs control for the UI of the integrated service apparatus 100. The UI controller 1202, for example, generates various operation screens to be displayed on the display 150 and detects a user operation of any of graphical user interface (GUI) parts and various mechanical buttons on the corresponding operation screen.

A setting management unit 1204 manages various pieces of setting information for the integrated service apparatus 100. Examples of the setting information managed by the setting management unit 1204 include setting information (power-outage-responding setting information 1206) regarding the power-outage-responding control in addition to the various functions such as the copying function and the scanning function. In addition, a power shutdown time is settable in the setting management unit 1204 (described later in detail). The power shutdown time is grace until power to be supplied to functions set in advance is shutdown in a case where a power outage occurs while the user is operating the local UI of the integrated service apparatus 100.

A power-outage detection unit 1208 detects a power outage (in other words, a state where the accumulated power in the power storage apparatus 160 is supplied to the components of the integrated service apparatus 100) in the external power supply that has supplied power to the integrated service apparatus 100. For example, the power storage apparatus 160 has a function of detecting the power outage in the external power supply. The power-outage detection unit 1208 of the information processing unit 120 acquires information regarding the presence or absence of the power outage from the power storage apparatus 160 (in other words, information indicating whether the power is supplied from the external power supply or by using the accumulated power). The power-outage detection unit 1208 may also acquire information such as remaining accumulated power or a history of amounts of power consumption from the power storage apparatus 160.

A power-outage-responding controller 1210 stops functions set in advance as stoppage targets in a power outage and performs control of switching between the operation screens in accordance with the stopping when the power-outage detection unit 1208 detects the power outage. A detailed example of the power-outage-responding controller 1210 will be described later.

An operating judgment unit 1212 judges whether the user is operating the local UI (such as the display 150 or the numeric keypad) of the integrated service apparatus 100. To judge whether the user is operating the local UI, a publicly known method may be used. For example, the user performs an operation (such as touching a screen, pressing a button, or inputting an instruction by using voice) on the local UI at a certain time point. Until at least a predetermined time elapses from the time point of the user operation, the operating judgment unit 1212 judges that the user is operating the local UI (an in-operation state). If a period in which any operation is not performed lasts for a predetermined time or longer, the operating judgment unit 1212 judges that the operation is no longer continued (a non-operation state). After that, the operating judgment unit 1212 judges the state as the non-operation state until the user performs an operation on the local UI. In another example, a sensor such as a human sensor for detecting a person near the front side of the integrated service apparatus 100 (the side of the integrated service apparatus 100 on which the display 150, the numeric keypad, and other components are disposed) may be provided. The operating judgment unit 1212 may judge the state as the in-operation state while the sensor is detecting a person and as the non-operation state while the sensor is not detecting a person.

FIG. 3 illustrates an example of the power-outage-responding setting information 1206 held by the setting management unit 1204. In the exemplified power-outage-responding setting information, a power-outage-responding-operation flag is provided for each function of the integrated service apparatus 100.

The functions herein include functions of hardware and software. The scanning mechanism 112, the printing mechanism 114, the faxing mechanism 116, the wired network and the wireless network (the network communication unit 118), the display 150, and the post-processing apparatus 130 are each the function of the hardware. The various server functions such as the mail server and the user authentication server are each the function of the software or the like provided by the server apparatus 140. In addition, a scanning service, a printing service, a copying service, FAX transmission, FAX reception, and a telephone service are software functions taking charge of UIs and information processing for faxing, telephone, and the like.

The power-outage-responding-operation flag is a setting item indicating whether to run a function during a power outage (that is, a period in which the power accumulated by the power storage apparatus 160 is supplied to the integrated service apparatus 100). A function having the power-outage-responding-operation flag set to ON is a running target function to be run during the power outage. In contrast, a function having the power-outage-responding-operation flag set to OFF is not to be run during the power outage. That is, the function having the power-outage-responding-operation flag set to OFF is a stoppage target function to be stopped during the power outage. The value of the power-outage-responding-operation flag may be fixed (that is, unchangeable by the user) or may be configured to allow the user (typically, an administrator of the integrated service apparatus 100) to set the value.

In addition, the power-outage-responding setting information may be configured to allow a base function to be registered for each function. The base function of a function (referred to as a first function) is a function based on which the first function is exerted. For example, while the printing mechanism is not in operation, the function of a post-processing apparatus is not exerted (in other words, it is not useful to operate the post-processing apparatus at that time). The printing mechanism is thus the base function of the post-processing apparatus. In addition, in a state where a wired or wireless network is not active, operating only the mail server is useless. The network function is thus the base function of the mail server. In the definition of the base function in this example, a network does not apply to the base function of the file server and the user authentication server. This is because the servers provide services to clients on the network, but the integrated service apparatus 100 may also be used alone (for example, a file in the file server is designated from the UI of the integrated service apparatus 100 and printed). In this exemplary embodiment, if the power-outage-responding-operation flag of a specific function is set to OFF, and if the specific function is the base function of a different function, the power-outage-responding-operation flag of the different function is automatically changed to OFF.

The power-outage-responding setting information illustrated in FIG. 3 indicates that the multiple functions of the integrated service apparatus 100 are each either the running target function for a power outage state or the stoppage target function. Alternatively, a list of the stoppage target functions in the power outage (also referred to as power-outage-responding stoppage target functions) among the multiple functions may be used as the power-outage-responding setting information. In this case, during the power outage, the power-outage-responding controller 1210 (described later) stops the stoppage target functions indicated by the power-outage-responding setting information and keeps the other functions. A list of the running target functions for a power outage state among the multiple functions may also be used as the power-outage-responding setting information. In this case, during the power outage, the power-outage-responding controller 1210 keeps the running state of the running target functions indicated by the power-outage-responding setting information and stops functions other than the running target functions.

Note that the content of the power-outage-responding setting information 1206 illustrated in FIG. 3 is merely an example. In another example, the power-outage-responding setting information 1206 may indicate rough settings in which, for example, the multifunction printer 110 (having the functions such as printing, scanning, and copying) is stopped during the power outage and the server apparatus 140 (such as the mail server and the file server) is not stopped during the power outage.

The basic criterion for whether to run or stop functions during the power outage is an amount of power consumption. During the power outage, power supply depends on the power storage apparatus 160 having limited remaining accumulated power. To use needed functions for a long time as much as possible, functions that consume a large amount of power need to be stopped. For example, the printing mechanism 114 needs to operate mechanisms for printing and thus consumes a large amount of power. In particular, in a case of using an electrophotographic system, considerable power is consumed to generate heat for fixing toner on a sheet. The scanning mechanism 112 also consumes relatively a large amount of power for mechanisms such as a document feeder, lighting on a document, and the like. The power consumption of the server apparatus 140 is lower than these amounts of power consumption. In addition, in a case of a power outage due to a disaster or the like, the mail server function and the other server functions are likely to play a beneficial role as an option for an information communication infrastructure. Accordingly, to increase an operating time of the integrated service apparatus 100 during the power outage, stopping power supply to the multifunction printer 110 having the printing mechanism 114 and the scanning mechanism 112 is a basic policy. However, functions to be kept during the power outage depend on the circumstances of the user. Accordingly, in the above example, the functions to be run during the power outage and the functions to be stopped may be configured to be set by the user.

Figure 4:
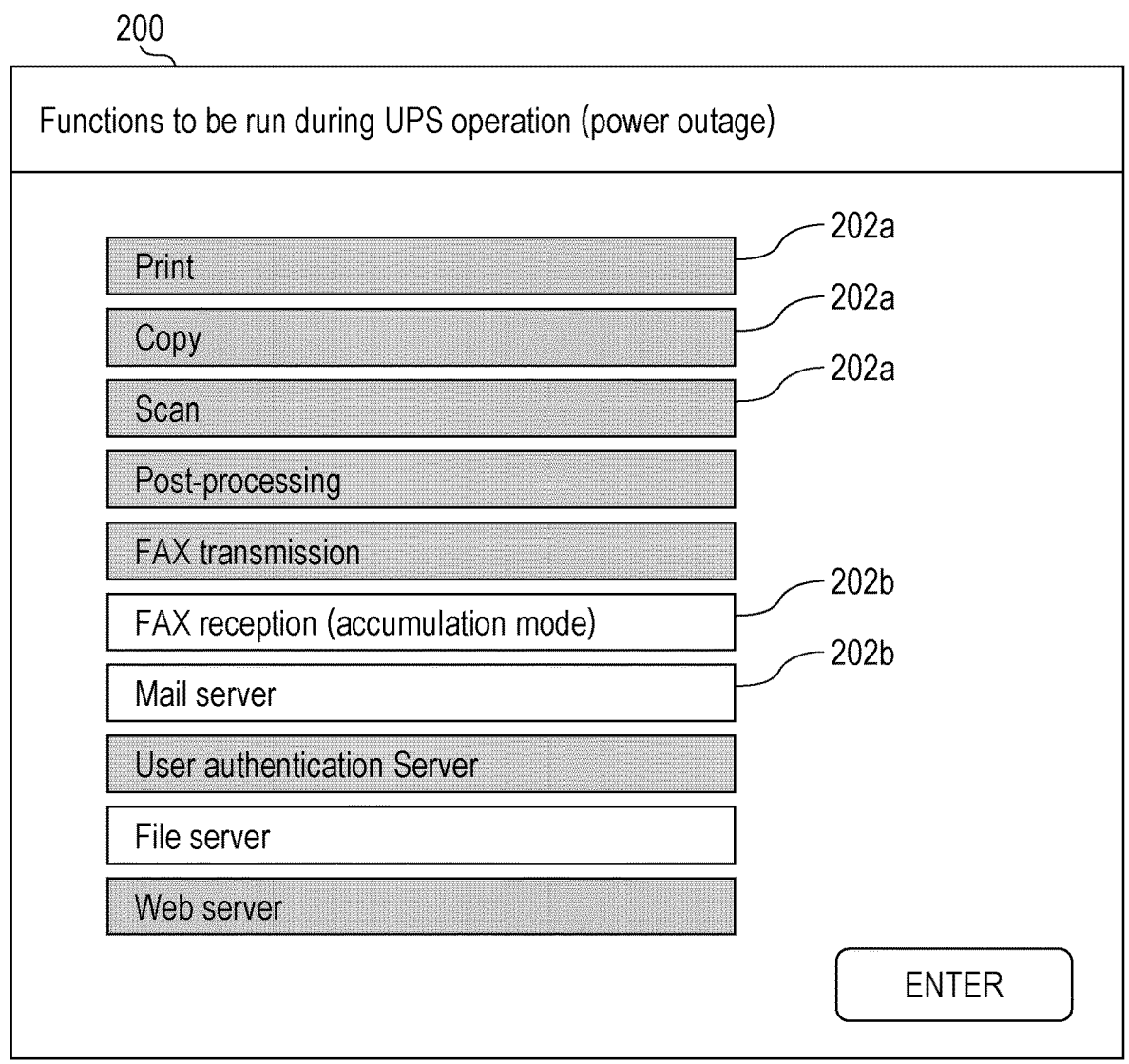
FIG. 4 is a view illustrating an example of a screen for setting the power-outage-responding setting information.

FIG. 4 illustrates a setting screen 200 for the power-outage-responding setting information 1206, the setting screen 200 being displayed by the UI controller 1202 on the display 150. In this example, GUI buttons 202a and 202b each displaying the name of a corresponding one of the functions are displayed on the setting screen 200. In the illustrated example, the color of each of the buttons 202a and 202b indicates the value of the power-outage-responding-operation flag of the corresponding function. Each gray button 202a indicates that the power-outage-responding-operation flag is OFF, while each white button 202b indicates that the power-outage-responding-operation flag is ON. For example, every time the user presses (taps) the button 202a or 202b, the value (ON or OFF) of the power-outage-responding-operation flag of the function corresponding to the button 202a or 202b is toggled, and the color of the button 202a or 202b is toggled between white and gray. The setting screen 200 called by the user displays values of the power-outage-responding-operation flags of the respective functions on which the current power-outageresponding setting information 1206 is reflected, and the user changes a value in order. The user checks the functions to be run during the power outage that are displayed on the setting screen 200. If the settings are intended settings, the user presses the ENTER button on the screen. In response to this, the setting management unit 1204 changes the content of the power-outage-responding setting information to the content indicating the state set on the setting screen 200.

In the power-outage-responding setting information 1206 in a default state (such as factory shipping settings), for example, the power-outage-responding-operation flag of each function (such as printing, copying, scanning, FAX transmission, and FAX reception) using the mechanisms of the multifunction printer 110 may be set to OFF, and the power-outage-responding-operation flag for each server function may be set to ON.

The setting method by which the power-outage-responding-operation flag is toggled by tapping the button 202a or 202b on the setting screen 200 is merely an example. To set the power-outage-responding setting information 1206, any of various publicly known methods may be used. For example, in response to tapping one of the buttons 202a and 202b, a screen for toggling the power-outage-responding-operation flag for the corresponding function may be called, and ON and OFF of the flag may be toggled on the screen for the toggling. In addition, in response to tapping the button 202a or 202b, a detail setting screen for a power outage state for the corresponding function may be called, and the details of operations of the function during the power outage may be set on the detail setting screen. For example, when the button for the Print function is pressed, a detail setting screen for toggling between the power-outage-responding-operation flags of the printing mechanism 114 as hardware and between the power-outage-responding-operation flags of the printing service as software may thereby be displayed. When the power-outage-responding-operation flag of the printing mechanism 114 is set to OFF on the screen, the power-outage-responding-operation flag of the printing service based on this is also changed to OFF. In contrast, even though the printing service is set to OFF, the printing mechanism 114 is not automatically changed to OFF. When the button for the FAX reception is pressed on the setting screen 200, a detail setting screen for the FAX reception may be displayed. The detail setting screen may be configured to select, as a FAX reception operation during the power outage, one of options such as stopping the entire FAX reception functions, accumulating data without printing received fax, and printing received fax.

An example of control performed by the power-outage-responding controller 1210 when the power-outage detection unit 1208 detects a power outage will be described with reference to flowcharts in FIGS. 5 and 6.

Figure 7:
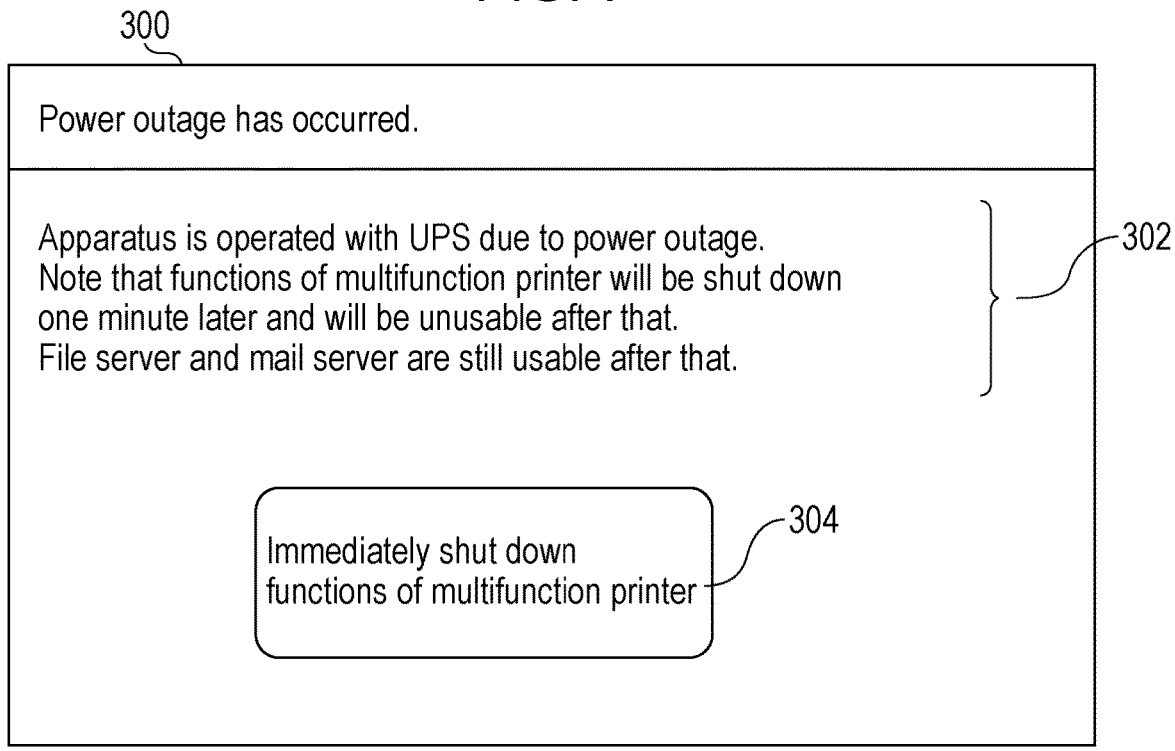
FIG. 7 is a view illustrating an example of a screen for a notice of power shutdown of at least one function, the screen being displayed during a power outage.

In this example, if a power outage is detected, the power-outage-responding controller 1210 inquires of the operating judgment unit 1212 whether the user is locally operating the integrated service apparatus 100 (S10). If the operating judgment unit 1212 makes a reply indicating that the user is operating the integrated service apparatus 100 in response to the inquiry, the power-outage-responding controller 1210 reads out a power shutdown time set in the setting management unit 1204 (S12). The power-outage-responding controller 1210 instructs the UI controller 1202 to display a power-shutdown notice screen (S14). The power-shutdown notice screen is a screen for noticing that functions set as stoppage targets in the power outage are to be stopped (that is, power supply to the functions is to be stopped). FIG. 7 illustrates an example of a power-shutdown notice screen 300. The power-shutdown notice screen 300 displays a message 302 for explaining the circumstances. The exemplified message 302 indicates that it is in a power outage state, the integrated service apparatus 100 is operated through power supply from the power storage apparatus (UPS), specific functions (the functions of the multifunction printer 110 in the illustrated example) will be unusable due to shutdown after a predetermined power shutdown time (one minute in the illustrated example), and other functions (the mail server and the like in the illustrated example) are still usable after that. If a power outage occurs while the user is operating the UI, and if the power-shutdown notice screen 300 is thus displayed, the user looks at the indicator and recognizes that the stoppage target functions will be unusable after the elapse of the predetermined time. If a user operation continued so far is an operation for using any of the stoppage target functions, and if processing using the function is not likely to be completed within the predetermined time, the user stops using the function. If the user operation continued so far is an operation for any of the functions to be run even during the power outage, the user presses an erase button (not illustrated) to disappear the power-shutdown notice screen 300, returns to the screen for the function, and continues the operation on the screen.

The power-shutdown notice screen 300 includes an instruction button 304 for shutting down the power-outage-responding stoppage target functions without waiting until the power shutdown time elapses. When the user presses the instruction button 304, the stoppage target functions are immediately shut down, and power supply to the stoppage target functions is stopped.

Note that the value of the power shutdown time is set in the setting management unit 1204 by a predetermined person such as the administrator. Countdown of remaining time before the power shutdown time may be displayed in consideration for a possibility of displaying the power-shutdown notice screen 300 in a long time to some extent. The power-shutdown notice screen 300 is caused to disappear when the instruction button 304 is pressed or after the predetermined time (for example, the power shutdown time) elapses. Thereafter, the screen displayed immediately before the power-shutdown notice screen 300 is displayed.

Referring back to FIG. 5, after step S14, the power-outage-responding controller 1210 waits until the power shutdown time elapses (S16). After the power shutdown time elapses, the power-outage-responding controller 1210 proceeds to step S18. If the user is not operating the local UI of the integrated service apparatus 100 in step S10, the power-outage-responding controller 1210 also proceeds to step S18.

In step S18, the power-outage-responding controller 1210 reads out the power-outage-responding setting information 1206 from the setting management unit 1204. The power-outage-responding controller 1210 stops (shuts down) the power-outage-responding stoppage target functions (that is, the functions having the power-outage-responding-operation flag set to OFF) indicated in the power-outage-responding setting information 1206 and stops power supply to the stoppage target functions (S20).

The power-outage-responding controller 1210 judges whether the currently displayed screen on the display 150 is the home screen of the integrated service apparatus 100 (S22). Note that the home screen is the screen that displays the menu of a list of the functions of the integrated service apparatus 100. The user selects, on the home screen, one of the functions that is intended to be used and opens a detail screen for inputting a detailed instruction for the function. If the judgment result in step S22 is Yes, the power-outage-responding controller 1210 instructs the UI controller 1202 to display a home screen 310 without GUI components (for example, icons) for selecting the stoppage target functions (S24). The power-outage-responding controller 1210 also instructs the UI controller 1202 to display an indicator in the Status field of the home screen 310 to indicate that the integrated service apparatus 100 is being operated through power supply from the power storage apparatus (UPS) (S26).

Figure 8:
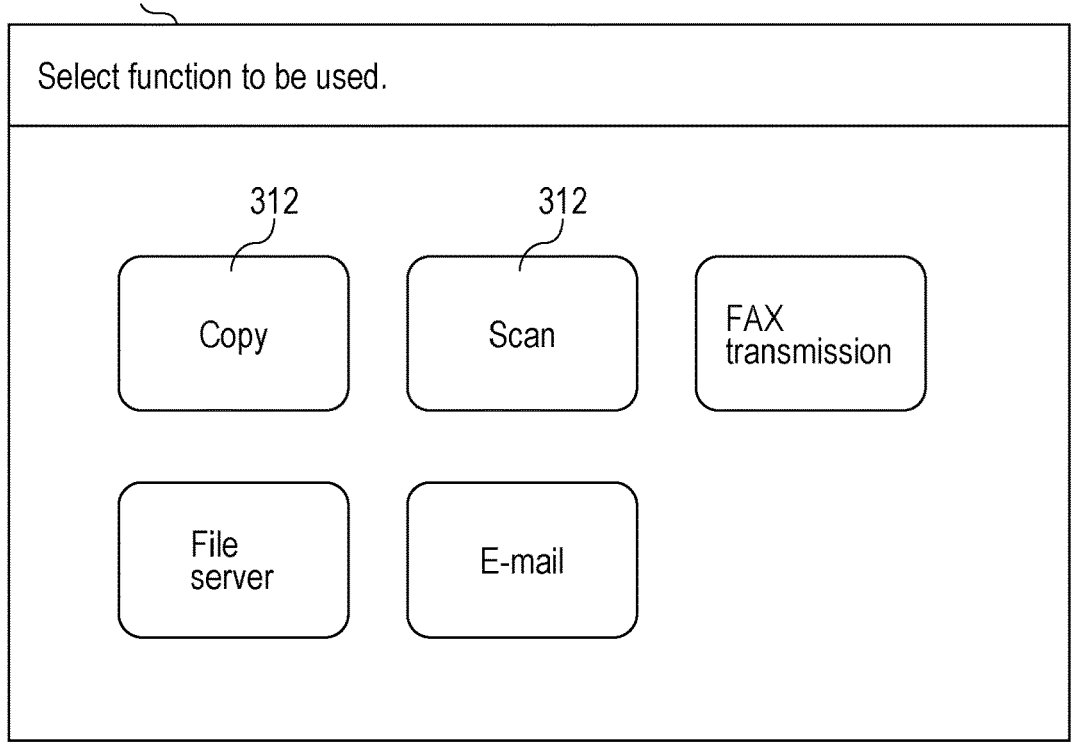
FIG. 8 is a view illustrating an example of a home screen (an initial screen of a multifunction printer) displayed in a normal state.

For example, the home screen 310 in the normal state (that is, a state not in a power outage) is exemplified as in FIG. 8. Icons 312 for calling the detail screen for a function such as Copy, Scan, FAX transmission, File server, and E-mail are displayed on the home screen 310. In contrast, on a home screen 310a in the power outage (see FIG. 9) that is displayed as a result of steps S24 and S26, the icons 312 for File server and E-mail that are first kept even during the power outage are displayed, but the icons for Copy, Scan, and FAX transmission that are the power-outage-responding stoppage target functions are not displayed. In addition, a Status field 314 displaying a message indicating that usable functions are limited because power is supplied from the UPS is displayed on the home screen 310a. From the indicator in the Status field 314, the user recognizes the reason for the absence of the icons for Copy, Scan, and the like on the home screen 310.

Figure 9:
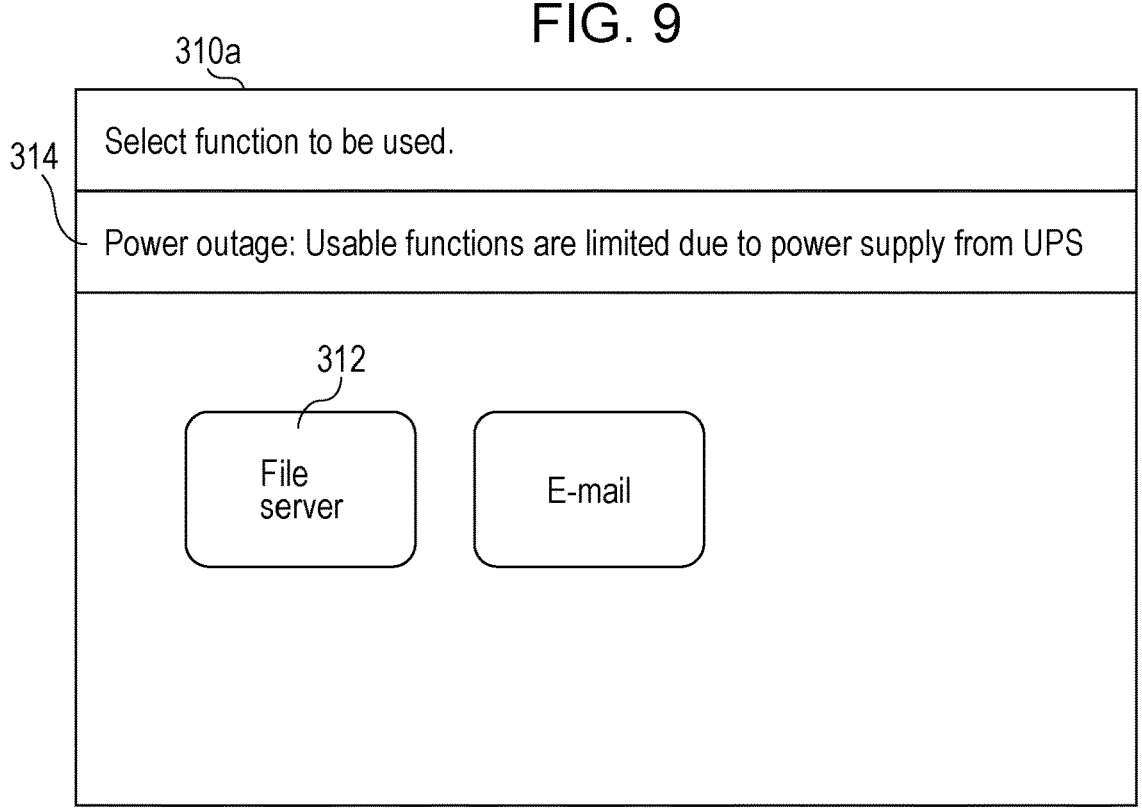
FIG. 9 is a view illustrating an example of a home screen during the power outage.

Note that the icons for the stoppage target functions are not displayed in step S24 and the example in FIG. 9, but the absence of the icons is merely an example. Alternatively, the icons for the stoppage target functions may be displayed in gray out (display in a less notable form than a normal form that indicates that selection is not allowed) and thus may be configured not to receive selection by the user. In another example, the same home screen 310 may be displayed regardless of whether in the normal state or the power outage state. When one of the icons 312 for a stoppage target function on the home screen 310 is pressed during the power outage, an indicator of stoppage of the function may be displayed (for example, the Status field on the home screen 310 indicates to that effect).

Figure 6:
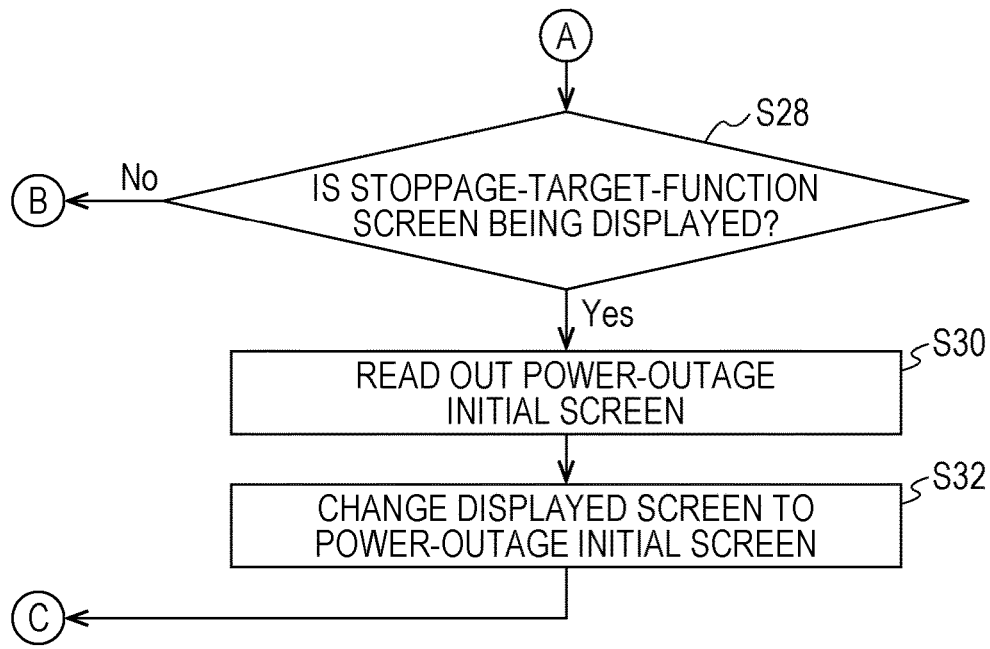
FIG. 6 is a flowchart illustrating the other part of the steps for the control by the power-outage-responding controller.

If it is judged that the currently displayed screen is not the home screen 310 (in other words, if one of the detail screens that is called by pressing the corresponding icon on the home screen 310 is displayed) in step S22, the power-outage-responding controller 1210 proceeds to step S28 illustrated in FIG. 6. In step S28, the power-outage-responding controller 1210 judges whether the currently displayed screen is the detail screen for one of the power-outage-responding stoppage target functions (S28). If the result of the judgment is No, that is, if the currently displayed screen is the detail screen for one of the functions to be run during the power outage, the power-outage-responding controller 1210 proceeds to step S26 and displays, on the detail screen, a status field (the same as the Status field 314 in FIG. 9) indicating that power is supplied from the UPS. If the judgment result in step S28 is Yes, the power-outage-responding controller 1210 reads out a power-outage initial screen set in advance (S30) and instructs the UI controller 1202 to display the power-outage initial screen (S32). The power-outage initial screen is set in advance by the user in the setting management unit 1204. For example, the user selects and sets, as the power-outage initial screen, one of candidates prepared in advance such as the home screen 310a (see FIG. 9) and the power-shutdown notice screen 300 (see FIG. 7). Thereafter, the power-outage-responding controller 1210 proceeds to step S26 and displays the Status field indicating the power supply from the UPS on the detail screen.

Figure 5:
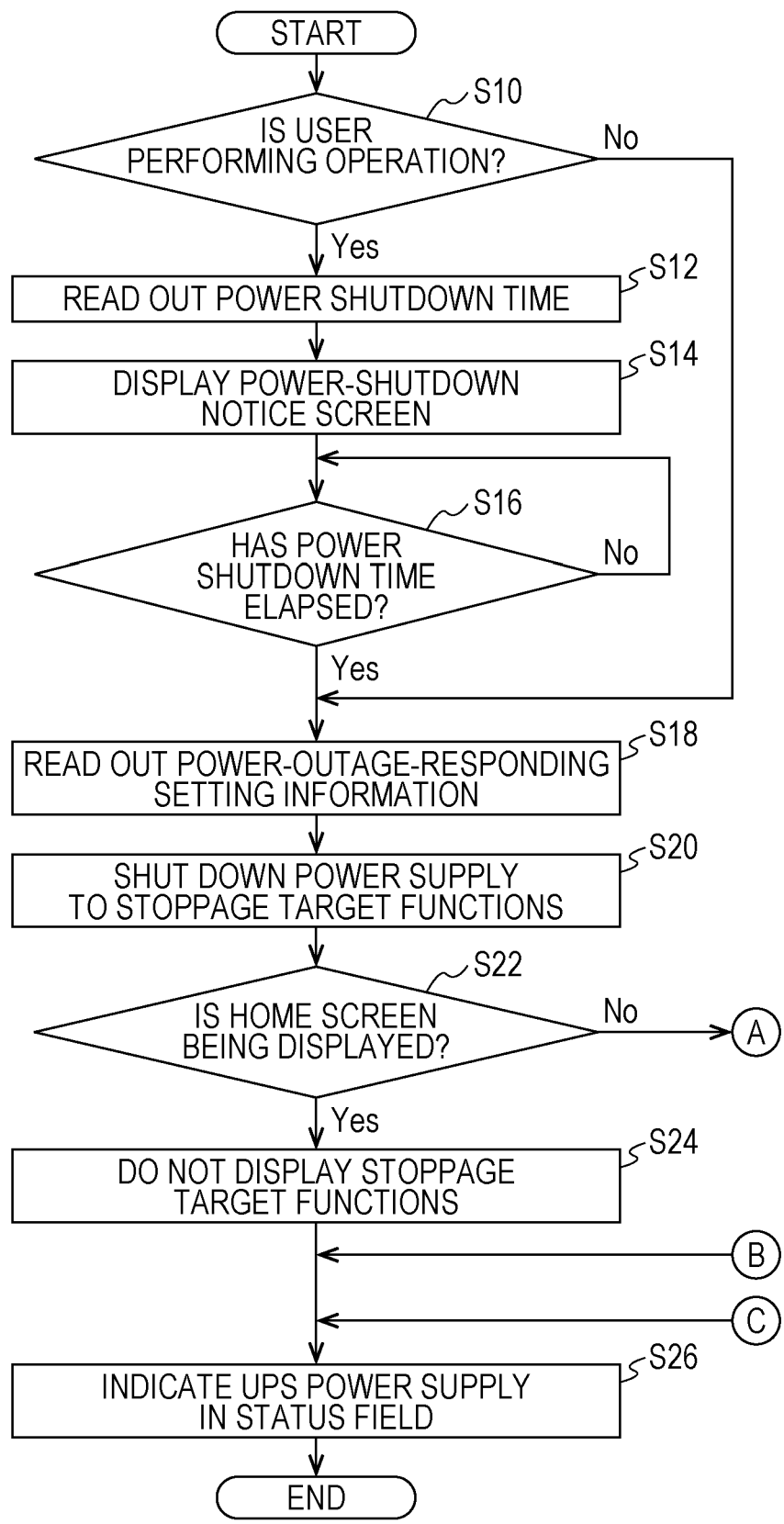
FIG. 5 is a flowchart illustrating part of steps for control by a power-outage-responding controller.

The steps in FIG. 5 are provided for the case where a power outage occurs while the integrated service apparatus 100 is being operated. In contrast, it is likely that a power outage occurs when the integrated service apparatus 100 is in a power-off state or a sleep state and that the power outage lasts even when the state transitions to an operating state after the integrated service apparatus 100 is started after the power outage. In this case, the power-outage-responding controller 1210 performs, for example, the following process. Specifically, when the integrated service apparatus 100 is started (at the time of powering on or recovery from the sleep state), the power-outage-responding controller 1210 inquires of the power-outage detection unit 1208 whether a power outage has occurred. If a reply indicating the absence of the power outage or the like is received, the power-outage-responding controller 1210 instructs the UI controller 1202 to display the home screen 310 (see FIG. 8) for the normal state on the display 150. In contrast, if a reply indicating the power outage state is received from the power-outage detection unit 1208, the power-outage-responding controller 1210 does not start the stoppage target functions indicated in the power-outage-responding setting information 1206 and stops power supply to the stoppage target functions. The power-outage-responding controller 1210 instructs the UI controller 1202 to display the power-outage initial screen set in advance (such as the home screen 310a in FIG. 9). Accordingly, in the case where the integrated service apparatus 100 is started during the power outage, the user is notified of the power outage state, and a UI enabling selection of functions usable during the power outage is provided.

The UI controller 1202 may also display a GUI component (for example, a button) for calling a list indicator for the functions usable during the power outage on the operation screen displayed on the display 150 during the power outage. When an instruction to display the list indicator is input in the GUI component, the UI controller 1202 displays a list screen displaying a list of the functions each having the power-outage-responding-operation flag set to ON and indicated in the power-outage-responding setting information 1206. From the list screen, the user recognizes the functions usable at that time (during the power outage). The indicator of each function on the list screen may also be linked to the detail screen of the function to enable the detail screen of the function to be called from the list screen. In addition, instead of the list of the functions usable during the power outage, a list of the functions unusable during the power outage (that is, the functions each having the power-outage-responding-operation flag set to OFF) may be displayed. Alternatively, both of the list of the functions usable during the power outage and the list of the functions unusable during the power outage may be displayed.

In the description above, when the power outage occurs (that is, when supply of the accumulated power in the power storage apparatus 160 is started), the processing in FIGS. 5 and 6 is immediately started. However, a power outage includes an instantaneous power outage in a short duration due to a lightning strike or the like. If stopping the stoppage target functions or changing the operation screen is performed during such a short-time power outage, processing or the like for returning the functions and the operation screen to the original state is needed at the time of recovery from the power outage, and thus it is troublesome. Hence, the power-outage-responding controller 1210 may be configured not to start the processing in FIGS. 5 and 6 immediately after detection of the power outage and configured to start the processing in FIGS. 5 and 6 after the power outage state lasts for a predetermined time period.

In this exemplary embodiment as described above, in a case where the integrated service apparatus 100 is operated due to the power outage through power supply from the power storage apparatus 160, power supply to at least one function set in advance is stopped, and thereby the operating time of the other functions is increased. The functions running during the power outage and the stopped functions (the stoppage target functions) are displayed on the operation screen (for example, the home screen 310*a*) in such a manner as to be discriminated from each other. In particular, the icons for the stopped functions are not displayed or displayed in gray out to thereby see the unusableness. This helps the user to recognize the usable functions easily. In addition, the power outage state and operation through power supply from the UPS (the power storage apparatus 160) are indicated (in the Status field 314) on the operation screen for the power outage state (the home screen 310*a* or the like). Accordingly, the user may be notified of the reason why the usable functions are limited.

Figure 2:
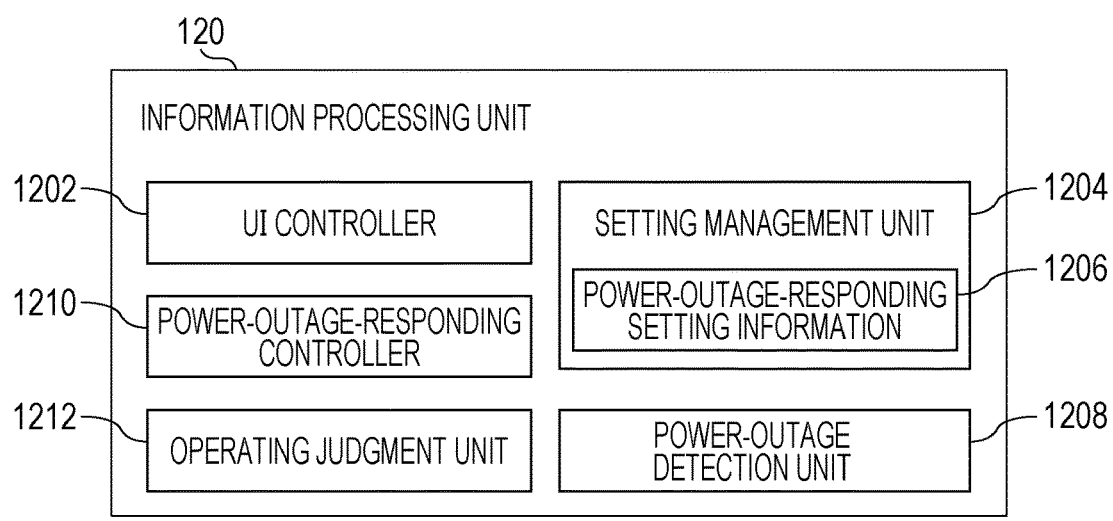
FIG. 2 is a diagram illustrating the functional configuration of an information processing unit.
Figure 10:
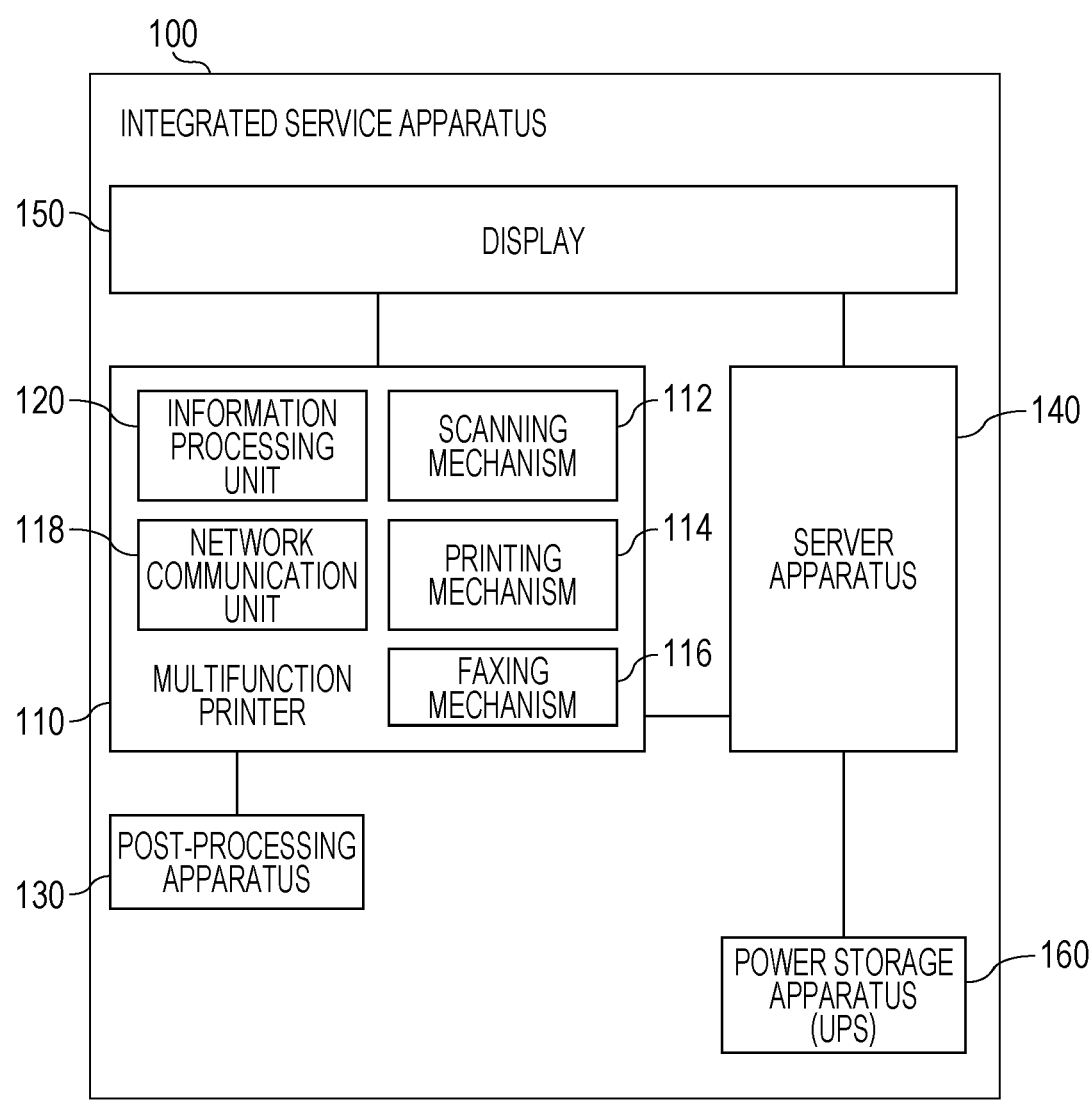
FIG. 10 is a diagram illustrating another configuration of the integrated service apparatus.

In the example apparatus configuration illustrated in FIG. 1, power is supplied to each of a block corresponding to the power storage apparatus 160, a block corresponding to the multifunction printer 110, and a block corresponding to the server apparatus 140, but the configuration is merely an example. Alternatively, a configuration as illustrated in FIG. 10 may be used. Specifically, power is supplied from the power storage apparatus 160 to the power supply circuit of the server apparatus 140, and the multifunction printer 110 receives the power from the power supply circuit of the server apparatus 140. With this configuration, even in a case where the entire multifunction printer 110 is shut down during the power outage, the server apparatus 140 may receive the power from the power storage apparatus 160.

Figure 11:
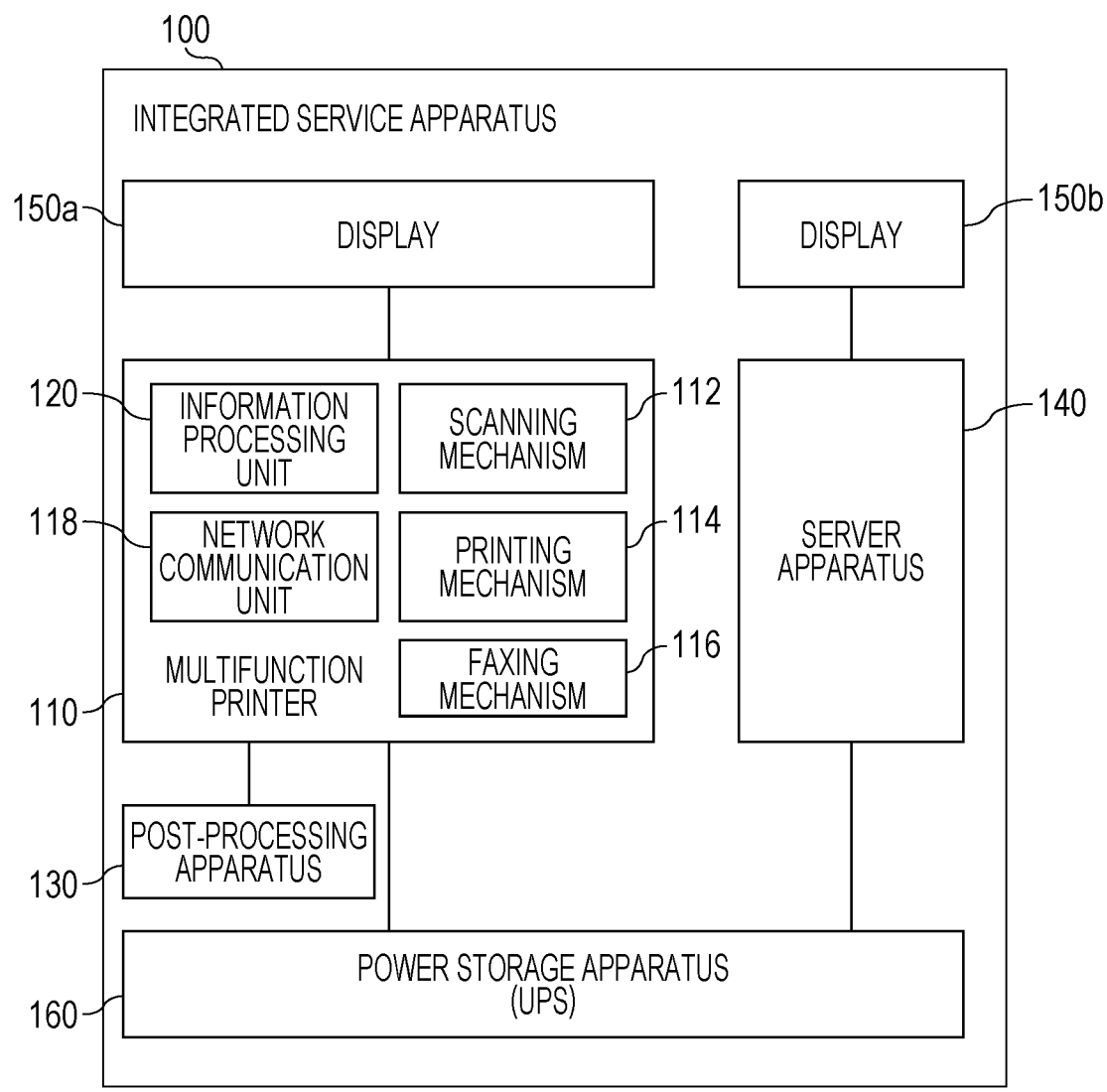
FIG. 11 is a diagram illustrating still another configuration of the integrated service apparatus.

In the example in FIG. 1, the multifunction printer 110 and the server apparatus 140 share the one display 150, but this configuration is merely an example. Alternatively, as illustrated in FIG. 11, a display 150*a* dedicated to the multifunction printer 110 and a display 150*b* dedicated to the server apparatus 140 may be separately provided. In this configuration, the display 150*a* displays the operation screen regarding the multifunction printer 110, while the display 150*b* displays information regarding the server apparatus 140. The display 150*b* may be, for example, a touch panel displaying the operation screen of the server apparatus 140 or may be simply a lamp indicating the operating state. When power supply to the multifunction printer 110 is stopped, power supply to the display 150*a* is also stopped. When power supply to the server apparatus 140 is stopped, power supply to the display 150*b* is also stopped. In one example, when a power outage occurs, the power-outage-responding controller 1210 shuts down the multifunction printer 110, the post-processing apparatus 130, and the display 150*a*. The power storage apparatus 160 thereby stops the power supply to the multifunction printer 110 side and supplies the power to the server apparatus 140 and the display 150*b*, and a period in which the server functions are keepable is extended.

A modification of the setting screen 200 for the power-outage-responding setting information 1206 will be described with reference to FIG. 12.

Figure 12:
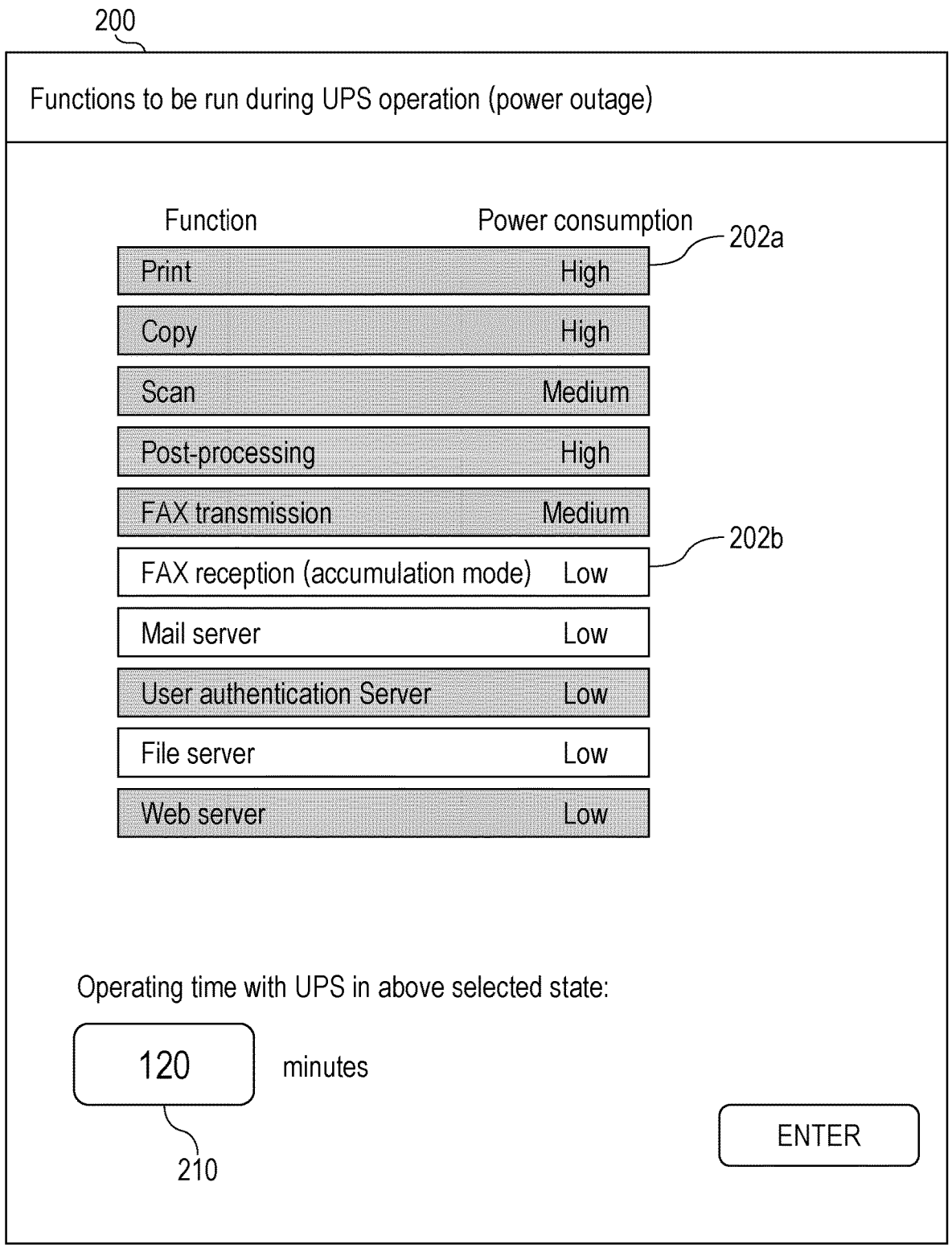
FIG. 12 is a view illustrating a screen for setting the power-outage-responding setting information, the screen displaying the degree of power consumption of each function and an estimated time of operation corresponding to the settings and using the power storage apparatus.

On the setting screen 200 illustrated in FIG. 12, information indicating the degree of power consumption of each function is displayed for the button 202*a* or 202*b* corresponding to the function. The information indicates an amount of power consumption per unit hour of the function by using levels. Although three levels of High, Medium, and Low are displayed in the illustrated example, the number of levels may be 2 or larger than 3. The user may use the information regarding the degree of power consumption as reference for determining functions to be stopped during a power outage.

In addition, an estimated operating-time display field 210 is displayed on the setting screen 200 in FIG. 12. In the estimated operating-time display field 210, an estimation value of a time period in which the integrated service apparatus 100 is allowed to be operated by using the power storage apparatus 160 is displayed in a state where whether to run or stop the functions during the power outage is selected on the setting screen 200. For example, the power-outage-responding controller 1210 has information regarding an amount of power consumption per unit hour of each function. The power-outage-responding controller 1210 refers to the information, totals amounts of power consumption per unit hour of the functions selected to be run during the power outage, and thereby obtains the value of an amount of power consumption per unit hour in the power outage of the entire integrated service apparatus 100. From this value and the maximum accumulation amount of the power storage apparatus 160, the power-outage-responding controller 1210 calculates an estimated operating time in the current selection state. The user may use the estimation value of the operating time as reference for determining functions to be stopped during the power outage.

A modification for further facilitating an operation for setting the power-outage-responding setting information 1206 will be described. It is conceivable that determining keeping or stopping the functions of the integrated service apparatus 100 during the power outage depends on the installation purpose of the integrated service apparatus 100. The installation purpose herein includes a purpose for installing the image forming apparatus. Examples of the installation purpose items include a type of business of a user (such as a company or a public organization) of the integrated service apparatus 100, an industry to which the user belongs, a place where the integrated service apparatus 100 is installed, the name of business, a user attribute, and a user name.

For example, some industries place a higher value on the scanning or printing function in the power outage than the server functions. For example, in some cases, a hospital or clinic needs to transfer a seriously ill patient to a hub hospital during a power outage due to a disaster. In such cases, an electronic chart of the patient needs to be printed and then taken over to the hub hospital, or on the contrary, a chart written on paper needs to be transferred to the hub hospital by faxing. Accordingly, a hospital or the like is likely to have a need not to set the printing function, the scanning function, and the FAX transmission function as the power-outage-responding stoppage target functions. In a financial institution such as a post office and a bank, various documents such as a payment slip written by a user are scanned and recorded in some cases. There is a need for keeping the scanning function even during the power outage.

For a place where the integrated service apparatus 100 is installed, for example, discrimination between an internal purpose and external purpose is conceivable. Specifically, the integrated service apparatus 100 is installed for the internal purpose for the user (for an office, a factory, or the like) of the integrated service apparatus 100 or for the external purpose (for a store, a public space, or the like). The integrated service apparatus 100 installed for the internal purpose for the user (such as a company) is typically used by staff of the user, and the integrated service apparatus 100 installed for the external purpose is typically used by customers of the user. The integrated service apparatus 100 installed for the customers has a need to output a printed material for a customer, and thus the printing function is desired to be kept during the power outage as much as possible.

In addition, even in one industry, functions desired to be kept during the power outage vary depending on the installation place in some cases. For example, in a case of the integrated service apparatus 100 installed for providing information to residents in the entrance of a public office, there is a need for outputting provided information in a form of a printed material, and thus the printing function has high priority during the power outage. In contrast, in a case of the integrated service apparatus 100 installed in a staff work space of a public office that is also a public space, it is conceivable that keeping the server functions during the power outage has higher priority than keeping the printing function.

Accordingly, in this modification, the integrated service apparatus 100 is provided with the power-outage-responding setting information 1206 as default setting information (templates on an installation-purpose basis) for each of installation purposes expressed on the basis of an industry for which the integrated service apparatus 100 is installed, an installation place, combination of these, and the like. A selection screen for the templates on an installation-purpose basis is provided as one of screens for setting the power-outage-responding setting information 1206. FIG. 13 illustrates an example of a template selection screen 220. Buttons 222 for selecting an installation purpose such as general offices, hospitals and clinics, financial institutions, staff in public offices, services to residents provided by public offices, and factories are listed on the template selection screen 220. When the user presses one of the buttons 222 that meets their installation purpose, the installation purpose becomes in a selected state. At this time, information regarding the template corresponding to the installation purpose (for example, a list indicating that the functions are to be run or stopped during the power outage) may be displayed on the screen to enable the user to check the details of the template. When the ENTER button is pressed after one of the buttons 222 for the installation purpose is selected, the template for the installation purpose overwrites the corresponding template in the power-outage-responding setting information 1206 in the setting management unit 1204. The UI controller 1202 displays, on the screen, the setting screen 200 (see FIG. 4) in which the value of the power-outage-responding-operation flag of each function in the overwritten power-outage-responding setting information 1206 is reflected and receives a change in the power-outage-responding ON or OFF setting of the function from the user. As described above, the user configures the power-outage-responding setting information 1206 meeting their needs in such a manner as to perform a fine adjustment of a template corresponding to the installation purpose.

A further modification will be described. In this modification, as remaining accumulated power of the power storage apparatus 160 is decreased during the power outage, the functions to be stopped are increased step by step.

In one example, pieces of power-outage-responding setting information 1206 are prepared for respective levels of the remaining accumulated power. As the remaining accumulated power of the power storage apparatus 160 is decreased during the power outage, the functions to be stopped are increased. The increase is performed on the basis of a piece of power-outage-responding setting information 1206 corresponding to the level of remaining accumulated power that is one level lower than the current level.

For example, in a case where the remaining accumulated power of the power storage apparatus 160 is in a range from the maximum value (full charge) to a half (a first level), a piece of power-outage-responding setting information 1206 (in particular, the power-outage-responding-operation flag) has settings as illustrated in FIG. 3. Specifically, the faxing mechanism, the wired network, the display 150, the mail server, the file server, the FAX reception in accumulation mode, and the telephone service are to be run, and the other functions are to be stopped. In addition, for example, in a case where the remaining accumulated power of the power storage apparatus 160 is in a range from the half of the maximum value to one fourth (a second level), a piece of power-outage-responding setting information 1206 corresponding to the range has settings in which the faxing mechanism and the FAX reception among the functions to be run in the full charge state are to be stopped. Also suppose a case where the remaining accumulated power is in a range from one fourth of the maximum value to a lower value (a third level). In this case, a piece of power-outage-responding setting information 1206 corresponding to the range has settings in which further the file server is to be stopped. For each level of the remaining accumulated power, the setting management unit 1204 provides the setting screen 200 for setting the power-outage-responding setting information 1206 corresponding to the level. Note that the setting screen 200 for the power-outage-responding setting information 1206 of a function for a certain level may be configured as follows. Specifically, if the power-outage-responding-operation flag of the function has been set to OFF for a level corresponding to a larger amount of remaining accumulated power than that of the certain level, the power-outage-responding-operation flag of the function is not allowed to be changed to ON on the setting screen 200 for the certain level. The exemplified level categorization of the remaining accumulated power is merely an example.

Figure 14:
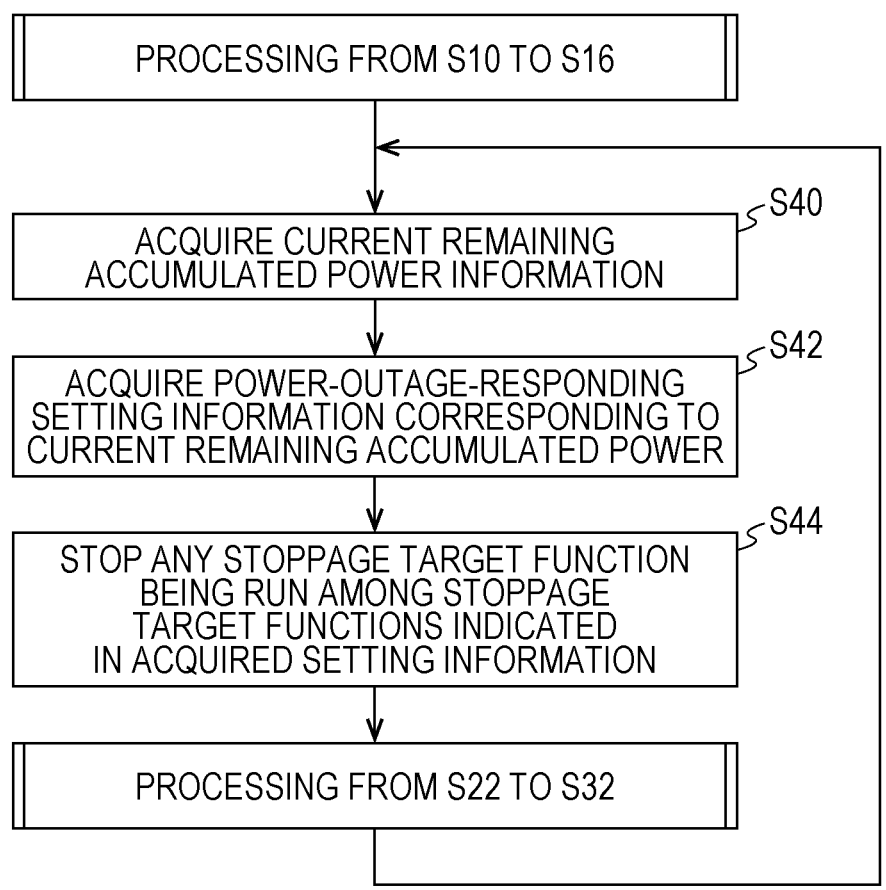
FIG. 14 is a flowchart illustrating steps for using different power-outage-responding setting information depending on remaining accumulated power.

In this modification, upon detection of a power outage, the power-outage-responding controller 1210 performs control illustrated, for example, in FIG. 14. The control is performed from step S10 to step S16 in the same manner as in FIGS. 5 and 6. If the judgment result in step S16 is Yes, the power-outage-responding controller 1210 acquires information regarding the current remaining accumulated power from the power storage apparatus 160 (S40) and acquires, from the setting management unit 1204, the power-outage-responding setting information 1206 corresponding to the level of the remaining accumulated power (S42). The power-outage-responding controller 1210 stops functions each having the power-outage-responding-operation flag set to OFF in the acquired power-outage-responding setting information 1206 (S44). At this time point, some functions have been stopped in some cases. In such cases, the power-outage-responding controller 1210 stops functions currently being run among the functions having the power-outage-responding-operation flag set to OFF. After step S44, the power-outage-responding controller 1210 performs processing from step S22 to step S32 in FIGS. 5 and 6 and repeats processing in steps S40, S42, S44 and steps S22 to S32, for example, regularly.

In this modification as described above, only the functions set in advance on a remaining-accumulated-power level basis are run, and power supply to the other functions is stopped. This enables only more strictly selected functions to be run when a small amount of accumulated power remains and enables the operating time of the functions to be increased.

The modification may also be combined with templates on the installation-purpose basis. Specifically, each template for the power-outage-responding setting information is held in the integrated service apparatus 100 for each of combinations of the installation purpose and the remaining-accumulated-power level. When the user or the like sets the power-outage-responding setting information and designates an installation purpose, the setting management unit 1204 reads out a template corresponding to the installation purpose prepared on a remaining-accumulated-power level basis and sets the details of the template (ON and OFF values of the power-outage-responding-operation flags of the functions) as the power-outage-responding setting information 1206 corresponding to the remaining-accumulated-power level. The setting management unit 1204 displays the content of the power-outage-responding setting information 1206 for each remaining-accumulated-power level in order on the screen and receives an instruction to change ON or OFF from the user.

Figure 15:
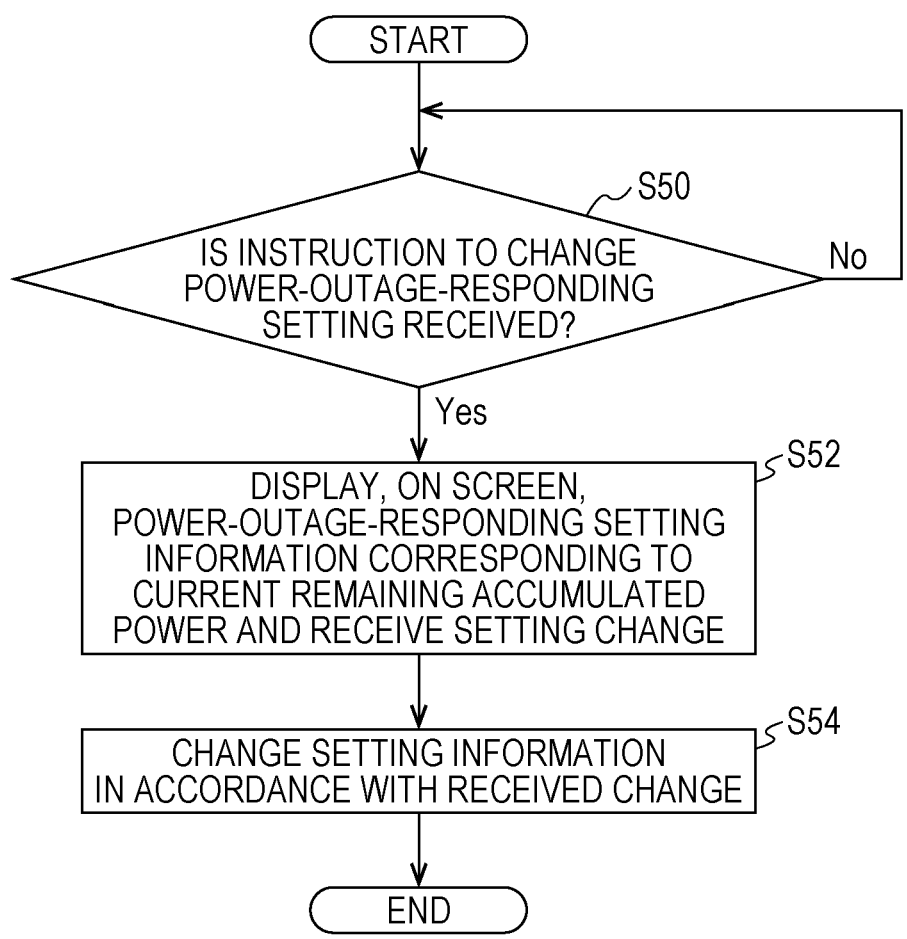
FIG. 15 is a flowchart illustrating steps for changing the power-outage-responding setting information during the power outage.

It is also conceivable that settings of the power-outage-responding setting information 1206 are intended to be changed during a power outage. Examples of the case include a case where a function set to be stopped in the current settings is desired to be used during the power outage. As illustrated in FIG. 15, when the setting management unit 1204 receives an instruction to change the settings of the power-outage-responding setting information 1206 from the user (the judgment result in step S50 is Yes), and if it is in a power outage state, the setting management unit 1204 causes the UI controller 1202 to display the setting screen 200 (see FIG. 4) in which the power-outage-responding setting information 1206 corresponding to the current remaining-accumulated-power level (in other words, the settings specifying the currently stopped functions) is reflected (S52). The buttons 202a and 202b in which the current running and stopping settings of the functions are reflected are thereby displayed on the setting screen 200. Accordingly, among the functions each having the power-outage-responding-operation flag set to OFF (that is, the stoppage targets), the user performs changing the power-outage-responding-operation flag of a function needed to be currently used to ON, changing the power-outage-responding-operation flag having set to ON but not currently needed to OFF, and the like. When the user presses the ENTER button, the setting management unit 1204 changes the indicator of the ON or OFF state of the power-outage-responding-operation flag of each function of the power-outage-responding setting information 1206 corresponding to the current remaining-accumulated-power level, indicator being displayed on the setting screen 200 (S54).

The information processing unit 120 and the server apparatus 140 of the integrated service apparatus 100 exemplified as above are implemented, for example, in such a manner that a computer is caused to run programs describing the functions of the components. The computer has a circuit configuration in which, as hardware, for example, a microprocessor such as a CPU, memories (primary memories) such as a random-access memory (RAM) and a read-only memory (ROM), a hard disk drive (HDD) controller that controls a HDD, various input/output (I/O) interfaces, and a network interface that performs control for connection to a network such as a local area network are connected, for example, via a bus. In addition, a disk drive for reading from and/or writing to a portable disk recording medium such as a compact disk (CD) or a digital versatile disk (DVD), a memory reader/writer for reading from and/or writing to a portable nonvolatile recording medium supporting various standards, such as a flash memory, and other components may be connected to the bus, for example, via the I/O interface. Programs describing processing details of the functional modules exemplified above are stored in a fixed storage such as a hard disk drive via a recording medium such as a CD or a DVD or via a communication medium such as a network and are then installed on the computer. The programs stored in the fixed storage are loaded in the RAM and run by the microprocessor such as the CPU, and thereby the functional modules exemplified above are implemented.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:
   a function providing unit that provides a plurality of functions including an image forming function and one or more server functions;
   a display that displays a first operation screen for operating the plurality of functions;
   a power storage apparatus that performs power supply to the image forming apparatus when power supply from an external power supply is absent;
   a holding unit that holds setting information in which a stoppage target function and a running target function among the plurality of functions are specified, the stoppage target function and the running target function being respectively stopped and run during the power supply from the power storage apparatus; and
   a display controller that performs control during the power supply from the power storage apparatus, the control being performed to display, on the display, a second operation screen indicating that the stoppage target function is unusable and the running target function is usable.

2. The image forming apparatus according to claim 1, wherein the display controller performs control not to display an operator for operating the stoppage target function on the second operation screen and to display an operator for operating the running target function on the second operation screen.

3. The image forming apparatus according to claim 1, wherein the display controller performs control to display, on the second operation screen, an operator for operating the stoppage target function in a form less notable than a form of an operator that is displayed on the first operation screen and that corresponds to the operator for operating the stoppage target function.

4. The image forming apparatus according to claim 1, wherein the display controller performs control to indicate, on the second operation screen, that the image forming apparatus is being operated through the power supply from the power storage apparatus.

5. The image forming apparatus according to claim 1, wherein in a case where the power supply from the power storage apparatus is started when an operation screen for the running target function is displayed, the display indicates, on the operation screen, that the image forming apparatus is being operated through the power supply from the power storage apparatus.

6. The image forming apparatus according to claim 1, wherein in a case where the power supply from the power storage apparatus is started when an operation screen for the stoppage target function is displayed, the display changes a displayed screen from the operation screen to a predetermined power-outage-responding operation screen that does not allow the stoppage target function to be selected as a used function.

7. The image forming apparatus according to Claire 6, wherein the power-outage-responding operation screen includes an indicator that indicates that the image forming apparatus is being operated through the power supply from the power storage apparatus.

8. The image forming apparatus according to claim 6, wherein in a case where the power supply from the external power supply is present when the image forming apparatus is started, the display displays a predetermined home screen, and in a case where the power storage apparatus performs the power supply when the image forming apparatus is started, the display displays a predetermined power-outage-responding operation screen different from the home screen.

9. The image forming apparatus according to claim 1, further comprising:
a stopping unit that stops the stoppage target function in a case where the power supply from the power storage apparatus is started while a user is operating the image forming apparatus, stopping unit stopping the stoppage target function when a predetermined time elapses after the power storage apparatus is started,
wherein the power storage apparatus performs the power supply for the stoppage target function until a predetermined time elapses after the power storage apparatus is started.

10. The image forming apparatus according to claim 9, wherein in a case where the power supply from the power storage apparatus is started while the user is operating the image forming apparatus, the display displays a screen indicating remaining time before stopping of the stoppage target function by the stopping unit.

11. The image forming apparatus according to claim 1, wherein the display further displays a screen that displays a list of the stoppage target function or a list of the running target function, the stoppage target function and the running target function being specified in the setting information.

12. A non-transitory computer readable medium storing a program causing a computer included in an integrated service apparatus to execute a process, the integrated service apparatus including a providing unit and a power storage apparatus, the providing unit providing a plurality of functions including an image forming function and one or more server functions, the power storage apparatus performing power supply when power supply from an external power supply is absent, the process comprising:
displaying a first operation screen for operating the plurality of functions;
holding setting information in which a stoppage target function and a running target function among the plurality of functions are specified, the stoppage target function and the running target function being respectively stopped and run during the power supply from the power storage apparatus; and
performing control during the power supply from the power storage apparatus, the control being performed to display a second operation screen indicating that the stoppage target function is unusable and the running target function is usable.

* * * * *